United States Patent [19]

Hillstrom

[11] Patent Number: 4,756,107
[45] Date of Patent: Jul. 12, 1988

[54] DISPLAY RETENTION AND TENSIONING FRAME

[75] Inventor: David U. Hillstrom, Novi, Mich.

[73] Assignee: Marketing Displays, Inc., Farmington Hills, Mich.

[21] Appl. No.: 38,011

[22] Filed: Apr. 14, 1987

[51] Int. Cl.[4] .............................................. G09F 17/00
[52] U.S. Cl. ......................................... 40/603; 40/156; 40/590; 40/591; 40/624; 160/378
[58] Field of Search ................. 40/603, 156, 590, 591, 40/624, 610, 615–617, 607; 160/378; 350/117

[56] References Cited

U.S. PATENT DOCUMENTS

| | | | |
|---|---|---|---|
| 1,484,231 | 12/1922 | Pistocco | 40/603 |
| 1,882,454 | 10/1932 | Spalding | 160/378 |
| 2,882,633 | 4/1959 | Howell | 40/156 |
| 3,205,601 | 9/1965 | Gawne et al. | |
| 3,310,901 | 3/1967 | Sarkisian | 40/156 |
| 3,386,198 | 6/1968 | Howell | |
| 3,885,335 | 5/1975 | Egermayer | 40/156 |
| 4,138,787 | 2/1979 | Sarkisian et al. | |
| 4,145,828 | 3/1979 | Hillstrom | |
| 4,512,094 | 4/1985 | Seely | |
| 4,512,095 | 4/1985 | Seely | |
| 4,523,400 | 6/1985 | Seely | |
| 4,580,361 | 4/1986 | Hillstrom et al. | 40/603 |

FOREIGN PATENT DOCUMENTS

| | | | |
|---|---|---|---|
| 529802 | 7/1954 | Belgium | 40/603 |
| 339325 | 12/1930 | United Kingdom | 40/603 |
| 479913 | 7/1938 | United Kingdom | 350/117 |
| 519632 | 4/1940 | United Kingdom | 350/117 |
| 893632 | 4/1962 | United Kingdom | 350/117 |

*Primary Examiner*—Robert Peshock
*Assistant Examiner*—J. Hakomaki
*Attorney, Agent, or Firm*—Harness, Dickey & Pierce

[57] ABSTRACT

A preferred sign frame and poster display device holds a sign or poster securely on all edges and allows for expansion and contraction of the sign. The sign frame and poster display device preferably includes a plurality of elongated frame sections, each having a base member and a hinged cover member. At least one slide member is mounted inside the base member for slidable movement generally in a plane parallel to the sign and poster surface. Each of the slide members includes a post member adapted to be received within a corresponding aperture near the perimeter of the poster or sign panel. Preferably, a retainer member is pivotally interconnected with a portion of the slide member for movement into and out of interlocking engagement with the peg or post after the poster or sign panel has been installed thereon in order to reinforce the peg or post and to securely retain the poster or sign panel in place during installation.

14 Claims, 2 Drawing Sheets

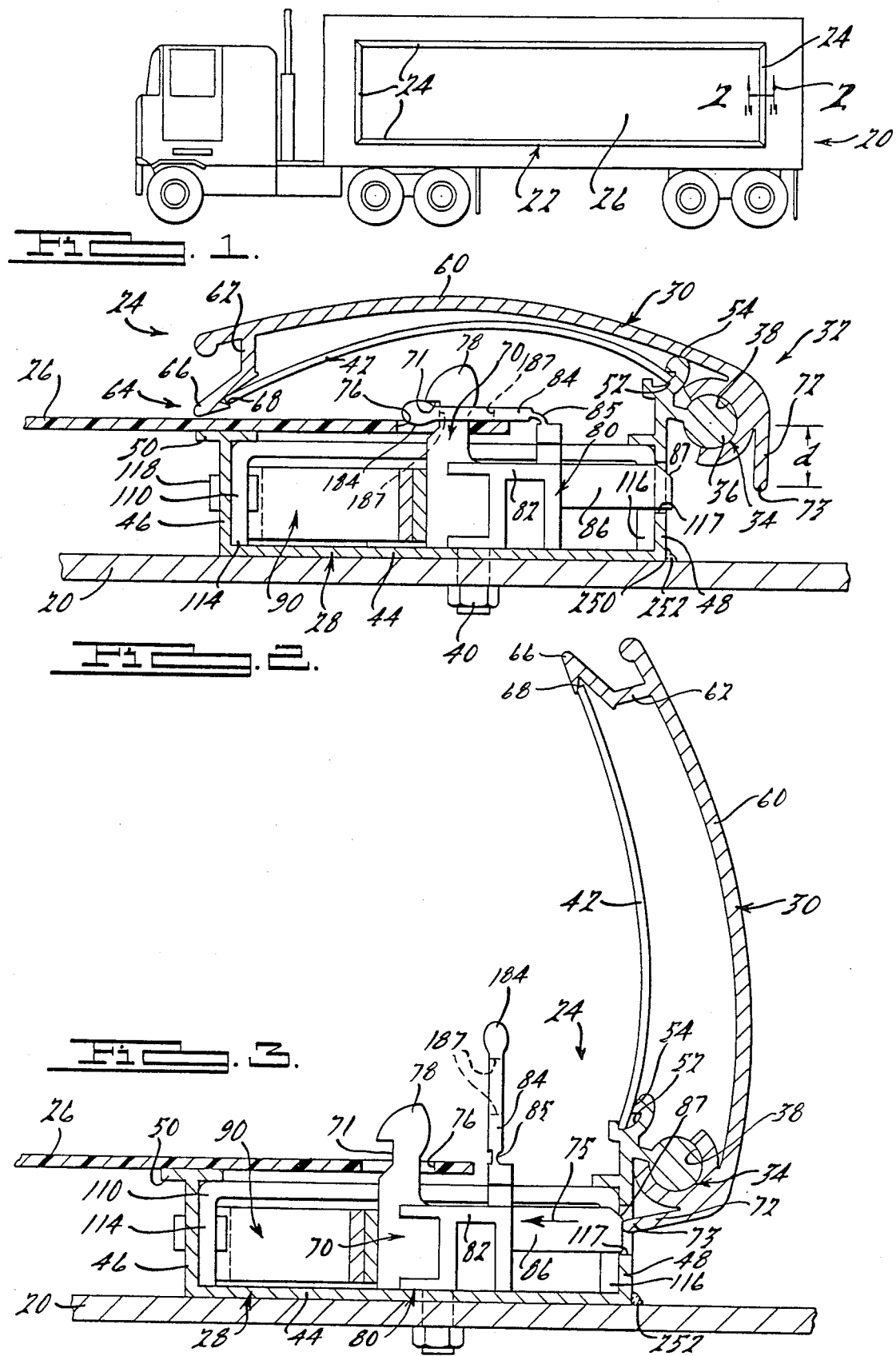

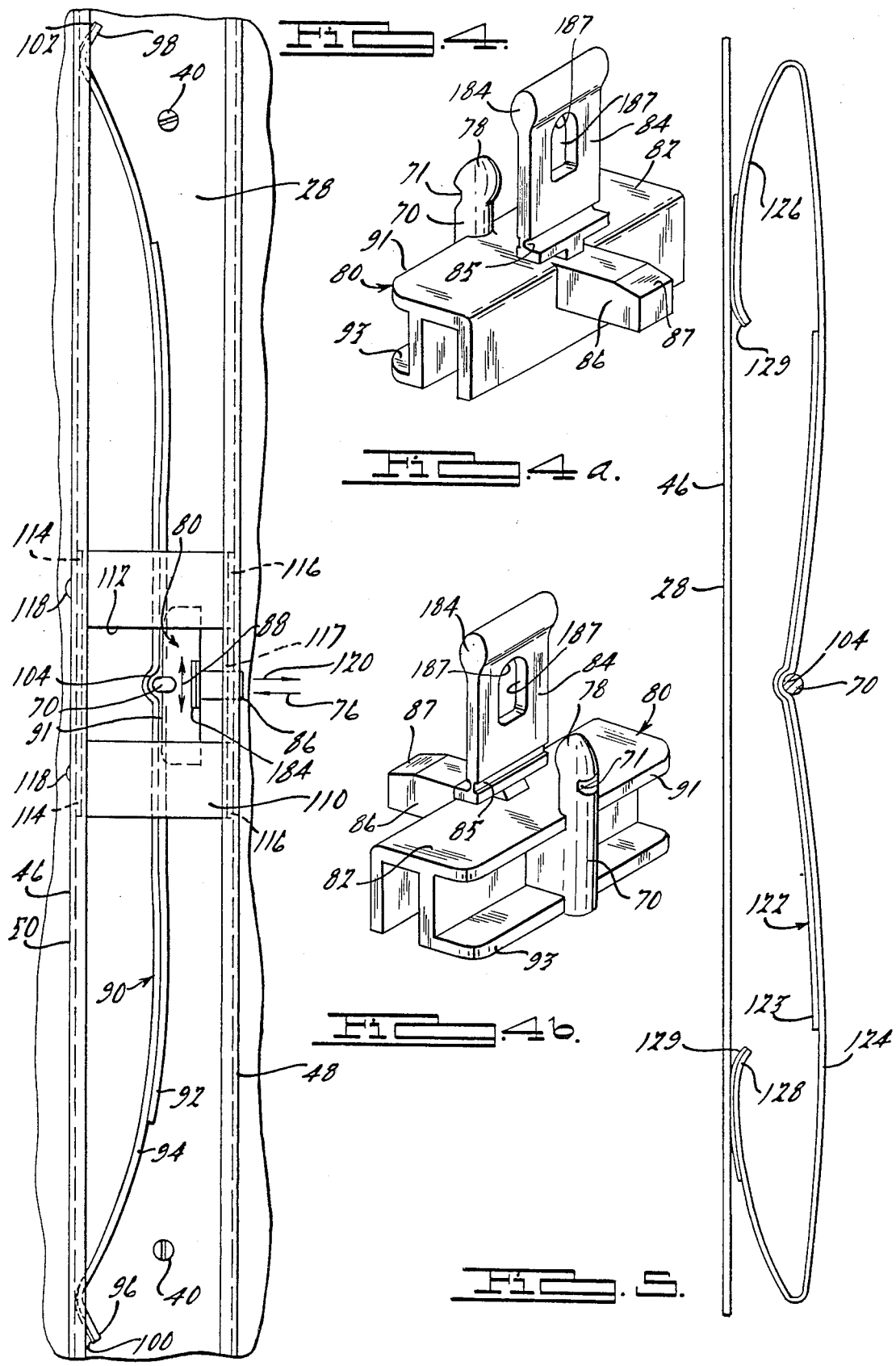

DISPLAY RETENTION AND TENSIONING FRAME

BACKGROUND AND SUMMARY OF THE INVENTION

The present invention relates generally to sign frames and poster display devices for displaying large signs, posters and other such displays. The invention is particularly advantageous in display frames for large signs and which provide means for accommodating expansion and/or contraction of the sign or poster within the frame, while securely retaining the sign or poster both during mounting and while in service.

Numerous sign frames and poster display devices are used for displaying various signs and messages for advertisement and information to the public. Large signs, especially those made of plastic or synthetic materials can undergo considerable expansion or contraction (e.g., one-half inch or more for every ten feet in length), which can adversely affect the sign's aesthetics and readability, as well as the integrity of the sign panel itself and the sign frame's ability to securely retain the sign. This problem is particularly acute in outdoor displays, highlighted or backlighted displays, and in mobile displays, or where signs are otherwise exposed to significant wind forces. Therefore, one of the primary purposes of the present invention is to provide a sign frame and poster display device for large sign applications in which the sign, poster or other display is exposed to temperature, weather, or other environmental conditions which tend to alter its shape.

One recent example of a display device that successfully addresses the problems discussed above is described in U.S. Pat. No. 4,580,361, which is assigned to the same assignee as the present invention, and the disclosure of which is hereby incorporated by reference. Although this display device has proved to be superior to those of the prior art, it has been found that the present invention provides even further improvements in the display's ability to securely retain large and unwieldy sign or poster panels during installation in the display frame, as well as after installation when subjected to high external loads such as high winds.

In accordance with the present invention, a preferred sign frame and poster display device holds the sign or poster securely on all edges and allows for expansion and contraction of the sign. The sign frame and poster display device can be of virtually any length or width and preferably includes a plurality of elongated frame sections, each having a base member and a hinged cover member pivoted together along their outside edges and preferably resiliently biased toward their open or closed positions in an over-center force arrangement such as that described in the above-mentioned U.S. Pat. No. 4,580,361. At least one slide member is resiliently mounted inside the base member in this embodiment of the invention and is adapted for movement in any direction in a plane parallel to the sign and poster surface. Each of the slide members includes a post or peg adapted to be received within a corresponding aperture near the perimeter of the poster or sign panel. Preferably, a retainer member is pivotally interconnected with a portion of the slide member for movement into and out of interlocking engagement with the peg or post after the poster or sign panel has been installed thereon. Such interlocking engagement of the retainer member with the peg or post greatly reinforces and increases the strength of the peg or post and to securely retain the poster or sign panel in place during installation, which significantly aids in the handling and installation of large or unwieldy posters or signs. After the poster or sign panel has been properly positioned along all of its edges, the hinged cover member is pivoted to its closed position, and the retainer members remain in their interlocking engagement with the corresponding slide members to reinforce the peg or post and to securely retain the poster or sign panel while the display assembly is in service. The retention arrangement of the present invention is also equally applicable to display devices having stationary poster or sign mounting apparatus in lieu of the above-discussed movable slide members, as well as to display devices other than the type described above.

Further objects, features and advantages of the present invention will become apparent from a review of the drawings when read in accordance with the accompanying specification.

BRIEF DESCRIPTION OF THE DRAWINGS

FIG. 1 illustrates a display device according to the present invention for displaying a poster or sign on the side of a truck trailer.

FIG. 2 is a cross-sectional view of the sign frame mechanism shown in FIG. 1, taken generally along line 2—2.

FIG. 3 is a cross-sectional view similar to that of FIG. 2, but showing the frame mechanism and the retainer member in their open positions.

FIG. 4 is a partial plan view of the frame mechanism, further illustrating the spring-biasing member for the slide member and the open retainer member.

FIGS. 4a and 4b are perspective views of the preferred slide member with its pivotally connected retainer member.

FIG. 5 illustrates an alternate embodiment of the spring-biasing member for use with the frame mechanism of the present invention.

DETAILED DESCRIPTION OF THE PREFERRED EMBODIMENTS

FIGS. 1 through 5 illustrate various preferred embodiments of a display device according to the present invention for use in displaying an advertising poster or sign on the side of a truck trailer. It will be readily understood by one skilled in the art, however, that the present invention is not limited to use on truck trailers or other such vehicles, but is adapted for a wide variety of uses whenever it is desired to securely retain and display changeable posters or signs tightly in place while allowing for expansion and contraction of the poster or sign panel. The present invention can be used, for example, on walls or building surfaces, on railroad cars, on billboards, in highlighted or backlighted advertising displays, and in various other applications differing from that shown for purposes of illustration in the drawings.

For ease of reference the sign frame and/or poster display device according to the present invention will be referred to herein by the term "display frame". Similarly, the sign or poster panel, which is mounted in the display frame will be referred to herein by the term "sign panel". These terms are not meant to be used in any limiting manner, but simply to provide for ease of reference in describing the invention.

In FIGS. 1 through 4b, a trailer 20 includes a display frame 22 securely mounted on one or both of its sides. The preferred display frame 22 typically has a rectangular or other polygonal configuration and includes a plurality of frame sections 24. Each frame section 24 is secured to the trailer 20 or other backing surface in a fixed manner, such as by standard mechanical fasteners. If the surface is uneven or irregular, various methods known in the art can be used to provide an intermediate flat surface for accommodating mounting of the display frame 22 or for filling in irregularities.

The corner intersections between adjacent frame sections 24 are preferably mitered at an appropriate angle (typically 45 degrees) to form an attractive and complete display frame 22. The frame sections 24 also preferably are held together in the corners by L-shaped corner braces (not shown) or by other known devices commonly used to hold portions of sign display frames together. A sign panel 26 is mounted and displayed in the center of the display frame 22 and is securely retained in a manner described in more detail below.

Each frame section 24 preferably includes a base member 28 and pivoting cover member 30. The base and cover member 30 are hinged or pivoted together at one side 32, such as by a mating ball and socket-type mechanism 34, as shown in FIGS. 2 and 3. The ball portion 36 is preferably formed as an integral part of the base member 28, while the mating socket portion 38 is preferably formed as an integral part of the cover member 30. One skilled in the art will readily recognize that the ball and socket members can optionally be reversed, with the ball portion incorporated in the cover member and the socket member incorporated in the base member. It should also be noted that other types of conventional pivoting or hanging mechanisms can optionally be used to pivotally interconnect the cover member 30 and base member 28.

The base members 28 and the cover members 30, which are preferably formed of aluminum extrusions, are preferably resiliently biased into their "closed" position shown in FIG. 2, and into their "open" position shown in FIG. 3, by a metal leaf spring 42 or other suitable resilient biasing members. Preferably, a plurality of the leaf springs 42 are positioned at spaced intervals along the length of each frame section 24 to provide the biasing force to resiliently hold the cover member 30 in either its open or its closed position.

Due to the spaced relationship of the pivot point of the leaf spring 42 relative to the pivotal axis of the pivoting mechanism 34, an over-center biasing force relationship results, which securely holds the cover member 30 in the position shown in FIG. 2 relative to base member 28 when the cover member is pivoted or swung downwardly into its closed position. Such over-center biasing force also holds the cover member 30 in its open position shown in FIG. 3 to provide for easy and convenient insertion or changing of the sign panel 26. Other display frames, which have biased and pivoting base and cover members, and to which the present invention can be applied, are shown in U.S. Pat. Nos. 3,310,901 and 4,145,828, both of which are assigned to the same assignee as the present invention.

The preferred base member 28 includes a U-shaped channel configuration with a flat bottom member 44 and two upstanding side members 46 and 48. One side member 46 has a flange 50 on its upper end which supports the sign panel 26 when it is placed in the frame section 24. The other side member 48 includes the ball portion 36 (previously described), as well as a channel 52 on its upper end. The channel 52 is preferably curved or arcuate in shape and receives one end of the leaf spring 42 for pivotal movement therein when the frame section 24 is open and closed. A stop portion 54 of the side member 48 is situated generally above and adjacent the channel 52 and is adapted to engage the cover member 30 and to act as a cover "stop", as is described in more detail below.

The cover member 30 includes central portion 60, with the socket member 38 disposed at one end and a flange member 62 disposed at its other end. The flange member 62 extends generally downwardly from the central portion 60 toward the sign panel 26, but its end 66 is preferably prevented from touching or resting upon the sign panel 26 by way of engagement of the stop 54 with the central portion 60. When the sign panel 26 is mounted in the sign display frame 22, it is preferred that the cover member 30 not directly engage the sign panel in order to accommodate free expansion, contraction, or other movement of the sign panel 26. It is possible, however, to modify or eliminate the stop 54, or to extend the length of the flange member 62 in order to otherwise allow the cover member 30 to directly engage the sign panel 26, if deemed desirable or necessary to aid in the retention of the sign panel 26.

A small gap 64 is preferably formed between the end 66 of the flange member 62 and the sign panel 26. This gap substantially eliminates friction between the surface of the sign panel 26 and the cover member 30, which can hinder the tensioning operation of the display frame 22, as described in more detail below. The gap 64 is preferably relatively small, however, in order to prevent dirt and other debris from entering the frame section 24. The close proximity of the end 66 of flange member 62 to the surface of the sign panel 26 also tends to prevent the sign panel 26 from being released from the post or peg members 70 (described below).

The end 66 of the flange member 62 also includes a channel member 68, which is adapted to receive one end of each of the leaf springs 42. In this manner, the leaf springs 42 are tightly positioned, and resiliently deflected between the channel 68 in the cover member 30 and the channel 52 in the base member 28 in order to exert the above-discussed biasing forces on the base and cover members 28 and 30, respectively.

The sign panel 26 has a plurality of openings 76 around its perimeter, which are situated and positioned to receive post members 70 on a plurality of slide members 80 movably disposed within the base members 28. As shown in FIGS. 2 and 3, the post members 70 have upper portions 78 which protrude at an angle toward the ball and socket mechanism 34 and aid in retaining the sign panel 26 in place when it is positioned over the top of the posts 70. The posts 70 preferably include notches 71 formed in their inner sides for interlockingly engaging the sign panel 26, and for other purposes described below.

The slide member 80, which is also shown in FIGS. 4 and 4b, is preferably composed of an injection molded thermoplastic material, such as high impact polypropylene, and has a main body portion 82, the integrally formed upstanding peg or post member 70, a protruding retainer member 84, and a rearward-extending tab portion 86.

The slide member 80 is situated on the bottom portion 44 of the base member 28 and is adapted to slide 360 degrees in any direction in a plane parallel to the bottom member 44 and thus parallel to the sign panel 26. The retainer member 84 can be used to manually adjust the slide member 80 lengthwise in the frame section 24 (as indicated by the arrow 88 in FIG. 4) so that the post member 70 can be positioned and aligned to be received within one of the openings 76 in the sign panel 26 when the sign panel 26 is mounted in the frame 24.

Adjacent the socket portion 38 on the cover member 30 is a protruding elongated flange member 72. The length "d" of the flange 72 is determined so that when the cover member 30 is rotated to its open position (shown in FIG. 3), an end 73 of the flange member 72 engages a tab portion 86 on the slide member 80 and urges the slide member 80 in a direction indicated by an arrow 75 in order to facilitate the tensioning function of the display frame 22 in a manner described in more detail below.

An opening 117 is formed in the side member 48 for allowing the flange member 72 to engage the tab member 86 on the slide member 80. The opening 117 has sufficient width to allow the slide member 80 to be adjustably moved a prespecified distance lengthwise in frame section 24 (i.e., in the direction of the arrow 88 in FIG. 4). A chamfer 87 is provided on the end of the tab member 86 to facilitate the slidable insertion of the tab member 86 through the opening 117.

An elongated spring member 90 is positioned within the frame section 24 and is adapted to engage and bias the slide member 80 outwardly thus providing the appropriate tension for the sign panel 26. The spring member 90 is preferably of two tempered steel leaf springs 92 and 94, a main leaf spring member 94 and a supporting or stiffening shorter leaf spring member 92. The ends 96 and 98 of the spring member 94 are bent generally outwardly so that the spring member 90 will abuttingly engage and slide along the side member 46 of base member 28. To ensure ease of sliding movement of the spring member 90 relative to the base member 28, antifriction materials 100 and 102 are preferably positioned adjacent the bent end portions 96 and 98 for engagement with the side member 46. Preferably, the antifriction materials 100 and 102 are ultra high molecular weight polymer tape, although other equivalent antifriction materials or structures can optionally be utilized, such as plastic cap members, ball bearing mechanisms, etc.

The spring member 90 preferably has a channel 104 formed in its center portion for engagement with, and retention of, the post member 70 of the slide member 80. The channel 104 maintains the appropriate relative positions of the slide member 80 and spring member 90 and tends to insure a uniform and consistent biasing force on the slide members 80 in each frame section 24. The spring member 90 is also calculated to provide spring forces which will firmly hold the sign panel 26 in tension at all times and yet allow the sign panel to expand and contract along with sliding movement of the slide members 80.

The slide member 80 and the spring member 90 are also preferably held in their relative positions in the frame section 24 by way of a pair of generally U-shaped support members 110. The support members 110 extend across the width of the channel in the base member 28 and are separated by an opening 112 through which the post member 70 and the retainer member 84 extend. Each of the support members 110 has two downwardly extending side flanges 114 and 116 which fit inside the side walls of the base member 28. A pop rivet 118 or other appropriate fastener is used to hold each support member 110 securely in place. The support members 110 are preferably made of aluminum or other sheet metal.

The slide member 80 preferably includes a pair of ledges or flanges 91 and 93 thereon. The ledges 91 and 93 substantially insure that the spring member 90 engages and seats properly with the slide member 80, and also tends to minimize friction between the metal spring member 90 and the frame section 24 or the U-shaped support members 110.

The retainer members 84 on the slide members 80 are pivotally interconnected with the main body portions 82, preferably by way of a reduced thickness portion that forms a living hinge 85. The retainer members 84 also include a locking aperture 187 extending therethrough for receiving the post members 70 therein. Thus, after the sign panel 26 is installed on the frame sections 24, with the post members 70 received in the sign panel apertures 76, the retainer members 84 can be pivoted generally downwardly to their closed positions shown in FIG. 3, with the retainer members 84 overlapping and retaining the sign panel 26. In such closed position the locking apertures 187 receive the post members 70 and preferably provide for an interlocking "snap-on" engagement with the notches 71, which are preferably formed in the inner sides of the post members 70. By such an arrangement, the preferred resiliency of the retainer members 84 and their living hinges 85 tends to resiliently urge or bias the retainer members 84 in a generally upward and outward direction and thus bias the retainer members 84 into such an interlocking engagement with the notches 71 on the post members 70. It should be noted that the locking apertures 187 can have virtually any other suitable shape in lieu of the generally rectangular shape shown for purposes of illustration in the drawings.

The arrangement described above, with the interlocking retainer members 84 and post members 70, greatly enhances the capability of the display frame 22 to securely retain the sign panel 26 on the display frame 22, even in the face of expansion, contraction, high winds or other such forces that tend to pull the sign panel 26 away from the display frame 22, or such outward forces on the sign panel 26 that would tend to urge the cover members 30 pivotally outwardly toward their open positions. The interlocking engagement of the retainer members 84 with their associated post members 70 also reinforces the post members 70, and in fact has been found to increase the strength of the post members 70 by approximately 300 percent of the corresponding post members shown and described in the above-mentioned U.S. Pat. No. 4,580,361, which generally discloses the display apparatus upon which the present invention is an improvement.

Preferably the retainer members 84 each include an outer end portion 184 that has an increased thickness over that of the remainder of the retainer member 84. The provision of the reinforced end portion 184 greatly increases the reinforcing effect of the retainer member 84 on the post member 70, as well as increasing the strength and durability of the retainer member 84 to withstand repeated snap-on and snap-off engagements and disengagements with the associated post member 70. In this regard, the locking apertures 187 in the retainer members 84 are preferably provided with a generally arcuate outer edge for purposes of better distributing loads between the post members 70 and the associated retainer members 84.

In addition to the above, the retainer member arrangement provides for greatly enhanced convenience and ease of installation of the sign panel 26 in the display frame 22. This is because each side, or portion of a side, of the sign panel 26 can be installed on each post member 70, and securely held in place by way of the interlocking engagement of the associated retainer member 84, before the user or installer moves on to another sign opening 76 and associated post member 70. This greatly aids in the handling of the sign panel 26 during installation, especially in the case of large or heavy sign panels that are easily blown about in high winds or that are otherwise difficult to lift or maneuver.

In operation, the plastic slide members 80 with the post members 70 thereon are moved into their "open" positions when the cover members 30 are opened. The flange member 72 on each cover member 30 engages and slidably urges the tab members 86 on the associated slide members 80 a predetermined distance in the direction of the arrow 75 shown in FIGS. 3 and 4 against the biasing force of the spring member 90. Thus when all of the cover members 30 are moved to their open positions, all of the openings 76 around the perimeter of the sign can be snapped or slipped over the corresponding post members 70 in the frame sections 24, and the retainer members 84 can be pivotally snapped over the corresponding post members 70 to retain the sign panel 26.

After the sign panel 26 is mounted and retained on the post members 70, the cover member 30 is rotated downwardly into its "closed" position (shown in FIG. 2). This releases the forces applied to the tab members 86 by the flange members 72, and allows the force of the spring member 90 to bias the slide members 80 in the direction of the arrow 120 (shown in FIG. 4), which is opposite to that of arrow 76. Thus arrangement automatically provides a tensioning force all along the sides of edges of the sign panel 26. The tensioning force is first applied along one side of the sign panel 26 as the associated frame section 24 is closed, and then along the other sides as each frame section 24 in turn is closed. When all of the frame sections are "closed", the tensioning force is spread out uniformly and evenly over the entire sign panel 26 in order to stretch and tightly hold the sign panel 26 in place in the display frame 22, thus presenting an unwrinkled planar surface for presentation of a message.

An alternate embodiment for the spring member 90 is shown in FIG. 5 and is designated genereally by the number 122. The spring member 122, like the spring member 90 described above, preferably has two components. The spring member 122 preferably includes a stiffening component 123 and an elongated component 124 with a pair of ends bent backwardly to form generally U-shaped channel ends 126 and 128. In order to decrease and minimize the friction between the spring member 122 and the side member 46 of the base member 28. antifriction material such as high molecular weight polymer tape 129 are positioned on each of the channel end portions 126 and 128.

In the present invention, the sign panel 26 is maintained and securely retained in a stretch and substantially wrinkle-free condition, regardless of the temperature and wind conditions, and also can be quickly and easily changed if desired. Additionally, when the inventive frame 22 is used on a vehicle or other structure which will be subjected to significant wind forces, such wind forces can be substantially prevented from entering the display frame 22 in the area behind the sign panel 26 by sealing the joint 250 (shown in FIG. 1) between the frame sections 24 and mounting surface with a sealing compound 252 or other appropriate structure, such as a gasket or the like.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A display frame device for holding and displaying a sign panel at an inner portion thereof, said sign panel having at least one sign panel opening extending therethrough generally adjacent an outer edge thereof, said display frame device comprising: a display frame assembly, said display frame assembly having a post member protruding therefrom, said post member having a free end adapted to be releasably received within and to extend through said sign panel opening, and retainer member pivotally interconnected with said display frame assembly for pivotal movement toward and away from said post member, and said retainer member having a locking aperture therein, said locking aperture being adapted to releasably receive said post member therein when said retainer member is pivotally moved toward said post member after said sign panel is installed on said display frame assembly with said post member extending through said sign panel opening in order to releasably retain said sign panel on said display frame device.

2. A display frame device according to claim 1, wherein said free end of said post member has an angled portion extending in a direction generally away from said sign panel.

3. A display frame device according to claim 1, wherein said post member includes a notch formed therein, said retainer member being releasably and interlockingly engageable with said notch when said post member is received within said locking aperture.

4. A display frame device according to claim 1, wherein said display frame assembly includes a slide member movably interconnected therewith for slidable movement relative thereto in generally inner and outer directions relative to said sign panel generally along a plane generally parallel to said panel, said post member being fixed relative to said slide member and movable therewith, and resilient biasing means for resiliently biasing said slide member and said post member in said generally outer direction relative to said sign panel in order to apply a resilient tensioning force on said sign panel when said sign panel is installed on said display frame assembly with said post member extending through said sign panel opening.

5. A display frame device according to claim 4, wherein said retainer member is pivotally interconnected with said slide member for pivotal movement relative thereto toward and away from said post member and for slidable movement therewith in said generally inner and outer directions relative to said sign panel.

6. A display frame device according to claim 5, wherein said retainer member is integrally formed with said slide member and pivotally interconnected therewith by a reduced thickness living hinge portion of said integral slide member and retainer member.

7. A display frame device according to claim 5, wherein said frame assembly includes a base member and a cover member pivotally interconnected with said base member for pivotal movement relative to said base member between an open position pivoted generally away from said base member and a closed position pivoted toward said base member, said slide member being movably interconnected with said base member for said slideable movement relative thereto, a portion of said cover member abuttingly engageable with a portion of said slide member when said cover member is pivoted to its open position in order to urge said slide member in said generally inner direction against the outward biasing force of said resilient biasing means, said resilient biasing means urging said slide member in said outer direction when said cover member is pivoted to its closed position in order to apply said resilient tensioning force on said sign panel when said cover member is in its closed position.

8. A display frame device according to claim 7, wherein said frame assembly further includes second resilient biasing means for resiliently biasing said over member toward said open position when said cover member is pivoted to a position closer to said open position than to said closed position, said second resilient biasing means further resiliently biasing said cover member toward said closed position when said cover member is pivoted to a position closer to said closed position than to said open position.

9. A display frame for holding a sign panel in tension therein, said frame being formed of a plurality of frame sections, each of said frame sections comprising:
a base member;
a cover member rotatably connected to said base member for movement between relatively open and closed positions;
slide means positioned in said base member, and having means thereon for holding and tensioning said sign panel;
means for biasing said slide means in a direction to place said sign panel in tension;
said slide means being responsive to the position of said cover member to decrease the tension on said sign panel when said cover member is rotated to said open position and to increase the tension on said sign panel when said cover member is rotated to said closed position; and
said means for holding and tensioning said sign panel including a sign panel opening extending through said sign panel generally adjacent an edge portion thereof, a post member protruding from said slide means and having a free end adapted to be releasably received within and to extend through said sign panel opening, and a retainer member pivotally interconnected with said slide means for pivotal movement toward and away from said post member, said retainer member having a locking aperture therein, said locking aperture being adapted to releasably receive said post member therein when said retainer member is pivotally moved toward said post member after said sign panel is installed on said display frame with said post member extending through said sign panel opening in order to releasably retain said sign panel on said display frame device.

10. A display frame device according to claim 9, wherein said free end of said post member has an angled portion extending in a direction generally away from said sign panel.

11. A display frame device according to claim 9, wherein said post member includes a notch formed therein, said retainer member being releasably and interlockingly engageable with said notch when said post member is received within said locking aperture.

12. A display frame device according to claim 9, wherein said retainer member is integrally formed with said slide means and pivotally interconnected therewith by a reduced thickness living hinge portion of said integral slide means and retainer member.

13. A display frame device according to claim 12, wherein said free end of said post member has an angled portion extending in a direction generally away from said sign panel.

14. A display frame device according to claim 9, wherein said post member includes a notch formed therein, said retainer member being releasably and interlockingly engageable with said notch when said post member is received within said locking aperture, said notch being formed in said post member at a position generally adjacent said angled portion.

* * * * *

UNITED STATES PATENT AND TRADEMARK OFFICE
CERTIFICATE OF CORRECTION

PATENT NO. : 4,756,107

DATED : July 12, 1988

INVENTOR(S) : David U. Hillstrom

It is certified that error appears in the above-identified patent and that said Letters Patent is hereby corrected as shown below:

| | | |
|---|---|---|
| Column 3, | line 38, | "members" both occurrences should be --member--. |
| Column 4, | line 10, | between "includes" and "central" insert --a--. |
| Column 5, | line 54, | "firmely" should be --firmly--. |
| Column 7, | line 36, | "Thus" should be --This--. |
| Column 7, | line 49, | "genereally" should be --generally--. |
| Column 7, | line 58, | "28." should be --28,--. |
| Column 9, | line 24, | "over" should be --cover--. |

Signed and Sealed this

Fourteenth Day of February, 1989

Attest:

DONALD J. QUIGG

*Attesting Officer*    *Commissioner of Patents and Trademarks*